Sept. 28, 1965  R. E. SMITH  3,208,592
METHOD OF CONTROLLING HYDROSEPARATOR OPERATION
Filed Nov. 3, 1961
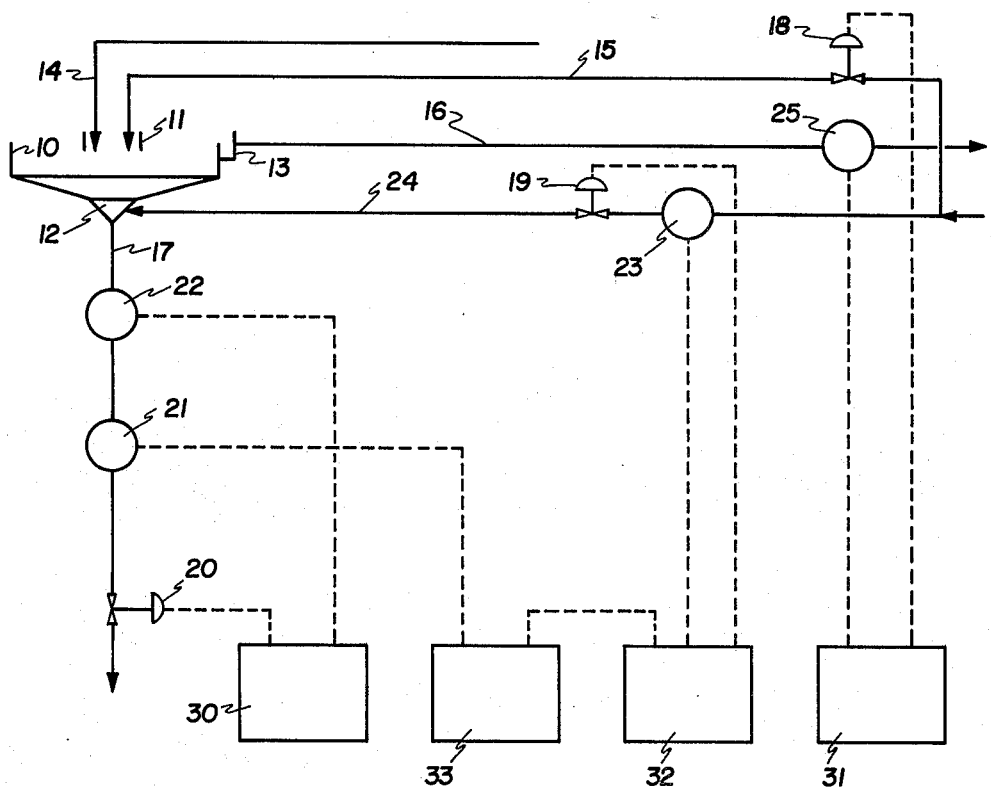
INVENTOR.
RANDAL E. SMITH
BY
Attorneys

United States Patent Office 3,208,592
METHOD OF CONTROLLING HYDROSEPARATOR OPERATION
Randal E. Smith, Carlsbad, N. Mex., assignor to Potash Company of America, Carlsbad, N. Mex., a corporation of Colorado
Filed Nov. 3, 1961, Ser. No. 150,086
8 Claims. (Cl. 209—158)

This invention relates to methods of control of the operation of hydroseparators, and more particularly to control of the operation of hydroseparators as used in circuits utilizing flotation concenetration of potash ores.

Hydroseparators have been employed in potash refining and other metallurgical processing operations for many years. Control of such hydroseparators has heretofore been on a manual basis, one of the chief methods of control being use of an adjustable pumping device for removing underflow products from the hydroseparator.

A hydroseparators is essentially a thickener having means for introducing a backwash flow near the underflow discharge. It includes an enlarged, generally circular or cylindrical tank containing a raking device arranged for scraping or plowing solids on the bottom of the tank to a centrally located cone-shaped outlet through the bottom of the tank. A feed well is situated at the top of the tank substantially at its center through which the feed is introduced in a graviy flow. Wash liquor, which in the case of potash processing, is a brine comprised of a saturated solution of the soluble constituents of the ore, is piped into the discharge cone of the hydroseparator in such a manner as to produce as little turbulence as possible in the body of solids descending therethrough. A launder extends around the upper edge or lip of the tank to collect overflow therefrom.

Such a hydroseparator operates like a thickener when used in the potash industry, and in operation a slurry of a mixture of solids of different composition in a brine carrier is fed into the feed well substantially centrally of the hydroseparator Due to the lack of substantial agitation, the solids tend to settle to the bottom of the tank as liquid flows upward and outward toward the upper overflow of the tank and into the launder or other collecting device located adjacent thereto. Heavy particles settle rapidly to the bottom in the quiescent liquid body, while lighter particles tend to collect or settle at a slower rate. Some of the lighter particles become entrained in the rising currents and do not have an opportunity to settle. They overflow with the liquid constituent of the slurry, and the separation performed by the apparatus is essentially a classification of solid particles.

As the said heavy particles settling to the bottom of the tank are brought to the center thereof by the rakes they descend into the discharge cone wherein wash liquor or brine is entering from backwash pipes to replace the liquid or brine moving with the discharging, heavier solids. This backwash also aids in the classification step above noted by entraining and moving lighter particles upwardly and ahead of it in a displacement, sorting action. The heavier discharging particles leaving the discharge cone thus have most of the lighter particles removed therefrom. This operation is known as desliming. Potash ore, as the ores of sylvite in the Carlsbad, New Mexico deposit, usually includes a quantity of fine clay which must be removed from the ore before the primary metallurgical separation or flotation can be performed, and removal of this clay is the function of the desliming operation.

For an efficient metallurgical treatment of potash ores it is essential, from an economic point of view, that the hydroseparator overflow be maintained at a constant rate to remove the bulk of the slimes with minimum removal of KCl particles. A low overflow rate into the launde causes more slimes to collect in the underflow from th discharge cone, which will require greater amounts of re agents for conditioning to permit satisfactory metallurgica performance in the following primary flotation operation. Conversely, if the overflow rate becomes too high there is a loss of KCl particles from the underflow whicl also is an economic detriment to the process.

Thus, it is important to predict and control the overflow and underflow discharge rates of a hydroseparator and it is a common practice in the industry to calculate the total volume of liquid or brine as an overflow rate o "rise" rate over the hydroseparator as a whole. Rise rate as used herein is the overflow velocity, i.e., the tota volume overflowing the hydroseparator divided by the cross-sectional area of the tank at the overflow level. I is normally expressed in feet per hour and is calculated by dividing the total overflow volume in cubic feet pei hour by the cross-sectional area of the tank in square feet The rise rate is controlled by liquid being introduced into the feed well with the feed slurry. Particles that tend to settle against a given rise rate are discharged from the discharge cone, whereas particles which settle more slowly than the rise rate are carried upwardly therewith and into the overflow launder. From the foregoing, the importance of proper control of the various flow parameters in a hydroseparator functioning as a classifying thickener in initial processing of ores, and particularly potash ores, is apparent.

In a hydroseparator without backwash liquid, treating materials like the fine clay above mentioned which settle very slowly in comparison to the KCl crystals of potash ores, the distribution of clay is almost exactly that of the brine, i.e., if 90% of the brine in the feed overflows, then 90% of the clay overflows also. The backwash cone offers further opportunity for classification since the material of heavy pulp density requires a relatively small volume of liquid to replace the slime-laden brine coming off with the solids. Thus, if the volume of the liquid entering the cone from the backwash pipes is equal to the volume of liquid leaving the underflow, above the cone, there is no flow of brine except for local disturbances. With a small excess of backwash liquid over that leaving the underflow discharge line, however, there is a rising current of brine through the feed material falling through the hydroseparator which aids in the separation.

Further, the feed rate of solids must balance the solids discharge rate. In prior practice, an operator had to observe the pump discharge and make adjustments based on observation to keep the hydroseparator feed and discharge under an essentially balanced control. If the pulp discharge density appeared lighter, the pump was slowed down, and conversely if the pulp density increased, the pump speed was increased. At best, this only amounts to a "cut-and-try" procedure.

Accordingly, it is an object of this invention to provide simple and efficient automatic controls for a hydroseparator to improve the efficiency of its operation.

It is another object of the invention to provide an efficient automatic control for various flow parameters of a hydroseparator.

It is still another obejct of the invention to provide easily operated instrumentation for the automatic control of various flow parameters of a hydroseparator functioning as a classifying thickener or desliming stage in potash beneficiation.

A further object of this invention is to provide instrumentation that includes means to maintain underflow discharge at a constant slurry density; maintain uniform rise rate so that size separation of particles being treated is substantially constant, and also to maintain overflow volume of backwash liquid at optimum conditions of hydroseparator operation.

These and other objects and advantages of methods of control of hydroseparators according to this invention will become obvious from the following description. However, the invention will be best understood by reference to the drawing in which a hydroseparator and control instrumentation therefor embodying the concepts of this invention are indicated in a schematic flow diagram.

In the drawing, a conventional hydroseparator tank 10 is shown having a substantially centrally located feed well 11, an underflow discharge cone 12 substantially centrally of the sloping bottom of the tank 10, and an overflow launder 13. Hydroseparator 10 is interconnected with novel instrumentation for controlling its various flow parameters. A line 14 discharges a feed slurry from a suitable source of supply (not shown) into feed well 11 and the feed is usually variable as to rate and also density. Introduction of clear brine or other process liquor or slurry is conducted through a conduit 15 under control of a valve 18. Brine and entrained slimes overflowing into launder 13 discharge therefrom through a conduit 16, and the underflow containing the deslimed solids discharges from cone 12 through a conduit 17.

Flow rates through conduits 15, 24 and 17 are variable by suitable manipulation or actuation of flow control valves 18, 19 and 20, respectively. Valve 20 is operated in response to signals initiated by a primary measuring element 22 in conduit 17. Another primary measuring element 23 in conduit 24 controls the introduction of backwash fluid, usually clear brine, through valve 19. Another primary measuring element 25 is located in conduit 16 to determine the volume of overflow passing from overflow launder 13.

In the first system, the discharge from cone 12 through conduit 17 is maintained at a constant slurry density by means of control valve 20 operated in response to signals transmitted by primary measuring element 22. Measuring element 22 is preferably a gamma ray attenuation device which measures the solid content and thus pulp density in the material flowing through conduit 17. Such devices are available commercially and operate on the principle that as the quantity or density of matter is increased in the slurry, more and more of the gamma rays are absorbed and thus variation in the intensity of the gamma rays is measured and used as a determination of pulp density. A density recorder and controller 30 serves as the means by which the signal generated by measuring element 22 operates and controls the valve 20 and thus the flow rate through conduit 17 to maintain the underflow discharge at uniform pulp density.

The second system involves maintenance of a uniform "rise" rate so that the size separation of particles being treated is closely controlled. Brine that rises through the contained slurry moves to the overflow launder 13, and thus the "rise" rate can be determined by measuring the volume of that overflow. To this end a volume measuring device 25 is included in line 16. Through operation of a flow recorder and controller 31, signals are formulated and transmitted by a volume measuring element 25, to control valve 18 which is operated to vary the volume of brine entering through conduit 15 into feed well 11 and thus to the contained slurry in hydroseparator 10.

The third system is quite important in the operation of a hydroseparator and deals with the volume of backwash liquid being introduced which needs to be varied with changes in feed through conduit 14. Backwash liquid is a clear brine that is introduced through conduit 24 into discharge cone 12 of the hydroseparator under control of control valve 19 responsive to primary measuring element 23. The amount of liquid required as backwash varies with the rate of underflow discharge and since the density of the underflow is kept constant by the first control arrangement 30, a simple measure of flow volume through conduit 17 provides a signal for the rate of backwash liquid. To this end, the primary measuring element 21, interconnected with a ratio recorder and controller 32 through a flow recorder and transmitter 33, provides the desired measure of flow volume through conduit 17. The ratio recorder and controller 32 uses the signal generated by the flow recorder and transmitter 33 and the signal from flow volume measuring element 23 to operate valve 19 and thus the amount of backwash fluid through conduit 24. In general, for control of hydroseparators according to this invention, I have found that introducing a backwash liquid at a rate about 125% of the liquid leaving the underflow usually provides for effective removal of slimes. Of course, this varies with the construction of the discharge cone and the type of materials processed, and is easily determined experimentally on a control unit.

Thus, I have provided a system which coordinates the "rise" rate, underflow discharge and overflow of a hydroseparator to the entering feed and provides effective and automatic instrumentation and control of such flow rates for optimum operation of the hydroseparator.

Another problem which frequently occurs in operation of hydroseparators is that in separating materials in which a very coarse fraction is required to be separated from a very fine fraction, material of a size range near the point of separation between such coarse and fine materials, which is designated in the literature as "critical," tends to accumulate in the separation zone. If the classifier operates for a considerable period of time under uniform conditions, the "critical" material accumulates and finally fills the classifier or alters the classification system parameters so as to drive out accumulated materials. The previous manual operation of a hydroseparator system tended to be variable and might correct or purge itself at intervals. Under manual operation, various means have been used to accentuate the purge, such as adding brine. However, with the control system of the instant invention above described, the "rise" rate can be automatically changed on a regular schedule by varying the overflow rate so as to alter the point of separation of particles being treated in the hydroseparator, and thus prevent accumulation of excess "critical" size material.

Having thus described my invention with sufficient particularity and detail as to enable those skilled in the art to practice it, what I desire to have protected by Letters Patent is set forth in the following claims.

I claim:

1. In a method for control of the operation of a hydroseparator, including a continuous introduction of a slurry feed, and of a separate flow of process liquid into a contained body of slurry in the hydroseparator, continuously overflowing liquid of the treatment from the surface of said body remote from said feed introduction, continuously removing settled solids of the treatment as an underflow pulp though a point of discharge at the bottom of the contained body and continuously introducing a backwash liquid into the underflow pulp discharge, the improvement which comprises establishing an essentially uniform pulp density in the underflow pulp by automatically controlling the volume of underflow discharge in relation to a continuous determination of pulp density, automatically controlling process liquor input into the contained body in relation to a continuous determination of overflow rate, and automatically maintaining a flow rate of the backwash liquid in a substantially constant ratio to a continuous determination of the flow rate of the underflow pulp discharge.

2. In a method for control of the operation of a hydroseparator, including a continuous introduction of a slurry feed, and of a separate flow of process liquor into a contained body of slurry in the hydroseparator, continuously overflowing liquid of the treatment from the surface of said body remote from said feed introduction, continuously removing settled solids of the treatment as an underflow pulp through a point of discharge at the bottom of the contained body and continuously introducing a backwash liquid into the underflow pulp discharge, the improvement which comprises automatically controlling the hydroseparator operation by continuously measuring pulp density of the discharging underflow pulp and maintaining it at an essentially constant value by controlling the volume of such discharge, continuously measuring the rate of overflow and maintaining it at a predetermined value by controlling the introduction of process liquor into the contained body, and continuously measuring the flow rate of the underflow pulp discharge and maintaining the flow rate of backwash liquid in an essentially constant ratio to the flow rate of the underflow pulp discharge.

3. In a method for the control of the operation of a hydroseparator, including a continuous introduction of a slurry fed, and of a separate flow of process liquid into a contained body of slurry in a hydroseparator, continuously overflowing liquid of the treatment from the surface of said body remote from said feed introduction, and continuously removing settled solids of the treatment as an underflow pulp through a point of discharge at the bottom of the contained body, the improvement which comprises establishing an essentially uniform pulp density in the underflow pulp by automatically controlling the volume of underflow pulp discharge in relation to a continuous determination of pulp density, and automatically controlling process liquid input into the contained body in relation to a continuous determination of overflow rate.

4. In a method for the control of the operation of a hydroseparator, including a continuous introduction of a slurry feed, and of a separate flow of process liquid into a contained body of slurry in a hydroseparator, continuously overflowing liquid of the treatment from the surface of said body remote from said feed introduction, and continuously removing settled solids of the treatment as an underflow through a point of discharge at the bottom of the contained body, the improvement which comprises establishing an essentially uniform pulp density in the underflow pulp by automatically controlling the volume of underflow discharge in relation to a continuous determination of pulp density, and automatically controlling process liquid input into the contained body in relation to a scheduled variation in overflow rate.

5. In a method for the control of the operation of a hydroseparator, including a continuous introduction of a slurry feed, and of a separate flow of process liquid into a contained body of slurry in a hydroseparator, continuously overflowing liquid of the treatment from the surface of said body remote from said feed introduction, continuously removing settled solids of the treatment as an underflow pulp through a point of discharge at the bottom of the contained body, and continuously introducing a backwash liquid into the underflow pulp discharge, the improvement which comprises establishing an essentially uniform pulp density in the underflow pulp by automatically controlling the volume of underflow discharge in relation to a continuous determination of pulp density, automatically controlling process liquid input into the contained body in relation to a scheduled variation in overflow rate, and automatically maintaining a flow rate of the backwash liquid in a substantially constant ratio to a continuous determination of the flow rate of the underflow pulp discharge.

6. In a method for the control of the operation of a hydroseparator, including a continuous introduction of a slurry feed, and of a separate flow of process liquid into a contained body of slurry in a hydroseparator, continuously overflowing liquid of the treatment from the surface of said body remote from said feed introduction, and continuously removing settled solids of the treatment as an underflow through a point of discharge at the bottom of the contained body, the improvement which comprises establishing an essentially uniform pulp density in the underflow pulp by automatically controlling the volume of underflow discharge in relation to a continuous determination of pulp density, and automatically varying the input of process liquid in relation to a varying overflow rate.

7. In a method for control of the operation of a hydroseparator, including a continuous introduction of a slurry feed, and of a separate flow of process liquor into a contained body of slurry in the hydroseparator, continuously overflowing liquid of the treatment from the surface of said body remote from said feed introduction, continuously removing settled solids of the treatment as an underflow pulp through a point of discharge at the bottom of the contained body and continuously introducing a backwash liquid into the underflow pulp discharge, the improvement which comprises automatically controlling the hydroseparator operation by continuously measuring pulp density of the discharging underflow pulp and maintaining it at an essentially constant value by controlling the volume of such discharge, and continuously measuring the rate of overflow and maintaining it at a predetermined value by controlling the introduction of process liquor into the contained body.

8. In a method for control of the operation of a hydroseparator, including a continuous introduction of a slurry feed, and of a separate flow of process liquor into a contained body of slurry in the hydroseparator, continuously overflowing liquid of the treatment from the surface of said body remote from said feed introduction, continuously removing settled solids of the treatment as an underflow pulp through a point of discharge at the bottom of the contained body and continuously introducing a backwash liquid into the underflow pulp discharge, the improvement which comprises automatically controlling the hydroseparator operation by continuously measuring pulp density of the discharging underflow pulp and maintaining it at an essentially constant value by controlling the volume of such discharge, continuously measuring overflow rate and scheduled variations therein, and varying the input of the process liquor in response to measured variations in the overflow rate.

References Cited by the Examiner

UNITED STATES PATENTS

| | | | |
|---|---|---|---|
| Re. 21,502 | 7/40 | Stedman | 210—83 XR |
| 1,140,131 | 5/15 | Derr | 210—83 |
| 1,953,672 | 4/34 | Damon | 209—454 XR |

HARRY B. THORNTON, *Primary Examiner.*

FRANK W. LUTTER, ROBERT A. O'LEARY,
*Examiners.*